(12) United States Patent
Kang et al.

(10) Patent No.: US 8,434,384 B2
(45) Date of Patent: May 7, 2013

(54) WEIGHT COMPENSATION MECHANISM AND METHOD USING BEVEL GEAR AND ROBOT ARM USING THE SAME

(75) Inventors: Sung Chul Kang, Seoul (KR); Woo Sub Lee, Seoul (KR); Chang Mook Chun, Gyeonggi-do (KR); Chang Hyun Cho, Gwangju (KR)

(73) Assignee: Korea Institute of Science and Technology, Seoul (KR)

( * ) Notice: Subject to any disclaimer, the term of this patent is extended or adjusted under 35 U.S.C. 154(b) by 252 days.

(21) Appl. No.: 12/862,327

(22) Filed: Aug. 24, 2010

(65) Prior Publication Data

US 2011/0271784 A1 Nov. 10, 2011

(30) Foreign Application Priority Data

May 6, 2010 (KR) ........................ 10-2010-0042422

(51) Int. Cl.
    *B25J 17/00* (2006.01)
    *B25J 17/02* (2006.01)
    *B25J 18/00* (2006.01)

(52) U.S. Cl.
    USPC ............... 74/490.01; 74/490.05; 74/490.03; 901/48

(58) Field of Classification Search ............ 74/469, 74/490.01–490.06, 479.01; 901/15, 26, 28, 901/29, 48; 185/27, 28, 32, 37, 38
    See application file for complete search history.

(56) References Cited

U.S. PATENT DOCUMENTS

| | | | |
|---|---|---|---|
| 4,507,043 A * | 3/1985 | Flatau | 414/719 |
| 5,063,334 A * | 11/1991 | Tanita et al. | 318/568.1 |
| 5,115,178 A | 5/1992 | Umeda | |
| 5,138,904 A * | 8/1992 | Lande et al. | 74/661 |
| 5,220,849 A * | 6/1993 | Lande et al. | 74/479.01 |
| 5,231,889 A * | 8/1993 | Lee et al. | 74/479.01 |
| 6,145,403 A * | 11/2000 | Aschenbrenner et al. | 74/490.01 |
| 6,264,419 B1 * | 7/2001 | Schinzel | 414/751.1 |
| 6,298,569 B1 * | 10/2001 | Raab et al. | 33/503 |
| 6,952,977 B2 * | 10/2005 | Bohlken | 74/490.01 |
| 7,914,522 B2 * | 3/2011 | Morley et al. | 606/1 |
| 8,210,069 B2 * | 7/2012 | Chen et al. | 74/490.06 |
| 2003/0106390 A1 * | 6/2003 | Bohlken | 74/490.01 |
| 2007/0299427 A1 * | 12/2007 | Yeung et al. | 606/1 |
| 2008/0216596 A1 * | 9/2008 | Madhani et al. | 74/490.05 |
| 2008/0245165 A1 * | 10/2008 | Wang | 74/89.36 |
| 2009/0255711 A1 * | 10/2009 | Choi | 174/135 |
| 2010/0243344 A1 * | 9/2010 | Wyrobek et al. | 180/21 |
| 2011/0271784 A1 * | 11/2011 | Kang et al. | 74/490.01 |

FOREIGN PATENT DOCUMENTS

| | | |
|---|---|---|
| JP | 6-15593 A | 1/1994 |
| JP | 10-015874 A | 1/1998 |
| KR | 1995-0005077 | 5/1995 |
| KR | 1996-0008259 | 6/1996 |
| KR | 10-2007-0107839 A | 11/2007 |

* cited by examiner

*Primary Examiner* — Troy Chambers
*Assistant Examiner* — Alexander Vu
(74) *Attorney, Agent, or Firm* — Fenwick & West LLP

(57) ABSTRACT

Disclosed herein is a weight compensation mechanism. A weight compensation mechanism is installed in a link member rotatable in a plurality of directions. The weight compensation mechanism includes a plurality of bevel gears that rotates in harmony with the rotation of the link member. Cam plates are connected to one or more of the bevel gears to be rotated together with the bevel gears. Weight offsetting parts are connected to the cam plates, respectively, and each of the weight offsetting parts compresses an elastic member based on the rotation of the link member and the cam plate to absorb gravitation generated by the weight of the link member.

8 Claims, 5 Drawing Sheets

WEIGHT COMPENSATION MECHANISM AND METHOD USING BEVEL GEAR AND ROBOT ARM USING THE SAME

CROSS-REFERENCE TO RELATED APPLICATION

This application claims priority from and the benefit of Korean Patent Application No. 10-2010-0042422, filed on May 6, 2010, which is hereby incorporated by reference for all purposes as if fully set forth herein.

BACKGROUND

1. Field of the Invention

Disclosed herein is a multi-joint link mechanism such as a robot arm. More particularly, disclosed herein are a weight compensation mechanism for absorbing the influence of weight such as gravitation and a robot using the weight compensation mechanism.

2. Description of the Related Art

Recently, various robots have been developed, which facilitates life environment of human beings or assists work in industrial sites. Particularly, a large number of robots have been developed, which are used in various industrial fields including painting, welding and the like. Since such industrial multi-joint robot arms necessarily transfer and support high-weight objects for work, it is very important for the robots to output high torque.

Such a multi-joint robot arm receives load torque caused by its own weight or the weight of an object for work, and such load torque has direct influence on the design of the capacity of a driver such as a drive motor. Particularly, the relative importance of the torque component generated by the weight of the robot arm is very high in the weight applied to the drive motor.

When the capacity of a driver is determined in a related art robot arm, the gravitational torque generated by the weight of the robot arm is necessarily considered in addition to the torque generated by an object for work. Therefore, the capacity of a power source for driving the robot arm is necessarily increased. Also, a simple idea about the concept of theoretically compensating the gravitation generated by the weight of a robot arm or the like was conventionally proposed, but mechanisms to which the idea is practically applied have not been developed.

SUMMARY OF THE INVENTION

Disclosed herein are a weight compensation mechanism for offsetting influence of gravitation generated by the weight of a link mechanism such as a robot arm, provided with multi-degree-of-freedom joints and a robot arm using the weight compensation mechanism.

In one embodiment, there is provided a weight compensation mechanism installed in a link member rotatable in a plurality of directions, the weight compensation mechanism including: a plurality of bevel gears that rotates in harmony with the rotation of the link member; cam plates connected to one or more of the bevel gears to be rotated together with the bevel gears; and weight offsetting parts respectively connected to the cam plates, the weight offsetting parts each compressing an elastic member based on the rotation of the link member and the cam plate to absorb gravitation generated by the weight of the link member.

The plurality of bevel gears may include a central bevel gear fixed to a base; and a pair of moving bevel gears rotated while being engaged with the central bevel gear.

The cam plates may be connected to the pair of moving bevel gears, respectively.

The central bevel gear and the moving bevel gears may be supported by bearings in a gear box.

A connection shaft portion may be formed between the moving bevel gear and the cam plate, and the link member may be provided to the connection shaft portion to be rotated in one direction.

The cam plates and the weight offsetting parts may be connected to each other through steel wires, respectively.

A connection tool having the steel wire fixed thereto may be provided to one side of each of the cam plates, and the connection tool may be rotatably fixed to the cam plate.

Each of the weight offsetting parts may include a pair of fixing bodies disposed opposite to each other at an interval on one surface of the link member; an elastic member disposed between the fixing bodies; and a sliding body that compresses the elastic member while moving through the steel wire.

A guide bar inserted into the sliding body to be moved may be connected between the fixing bodies, and the elastic member that is a spring may be disposed to an outside of the guide bar.

The weight compensation mechanism may further include pulleys for supporting the movement of each of the steel wires.

In one embodiment, there is provided a robot arm including the weight compensation mechanism.

In one embodiment, there is provided a weight compensation method including: rotating a link member; rotating a plurality of bevel gears engaged with one another in conjunction with the link member; rotating cam plates connected to the bevel gears; and compressing elastic members provided to the link member based on the rotation of the cam plates.

BRIEF DESCRIPTION OF THE DRAWINGS

The above and other aspects, features and advantages disclosed herein will become apparent from the following description of preferred embodiments given in conjunction with the accompanying drawings, in which.

DETAILED DESCRIPTION OF THE INVENTION

Figure 1:
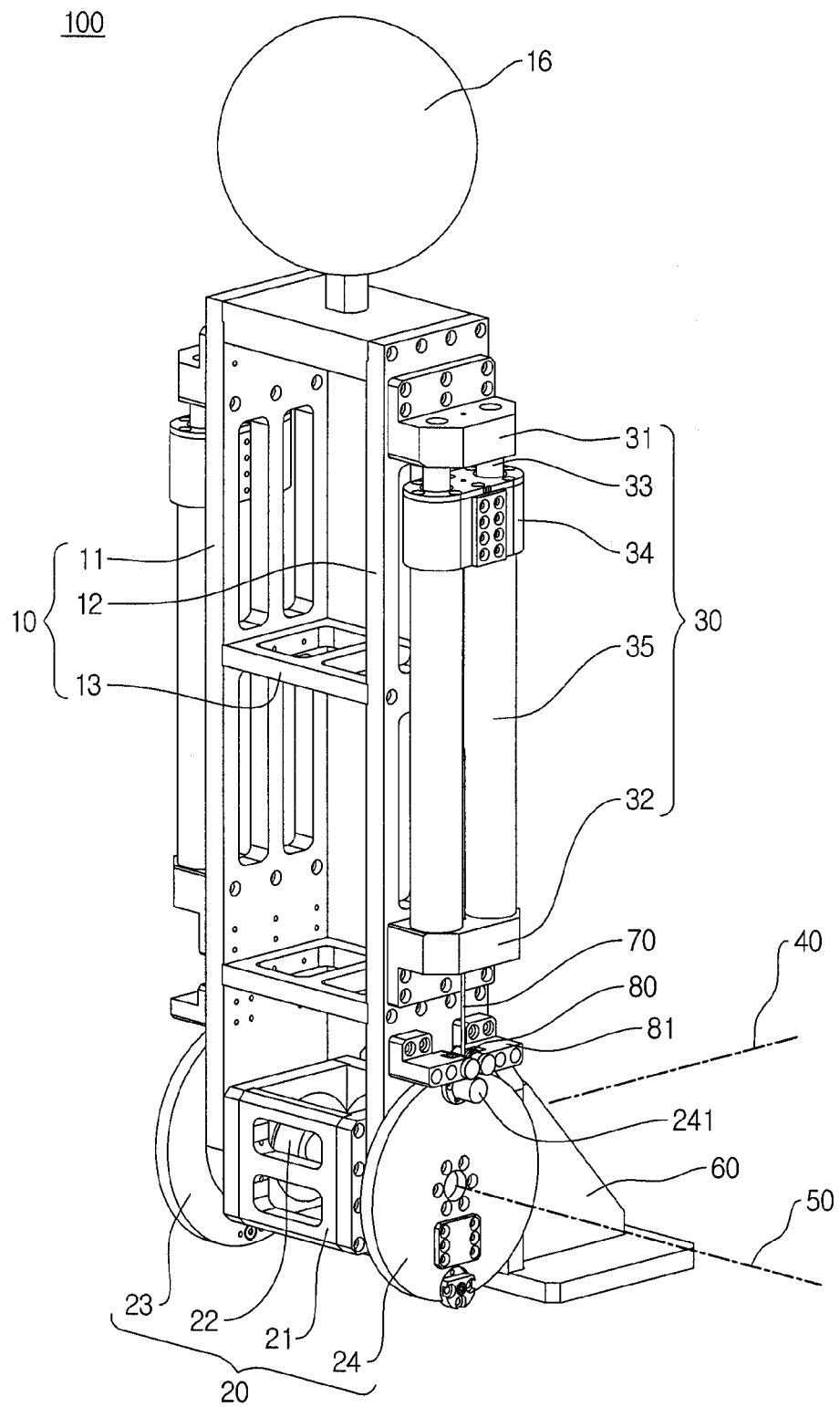
FIG. 1 is a perspective view of a robot arm having a weight compensation mechanism according to an embodiment.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements. The shape, size and regions, and the like, of the drawing may be exaggerated for clarity.

Figure 2:
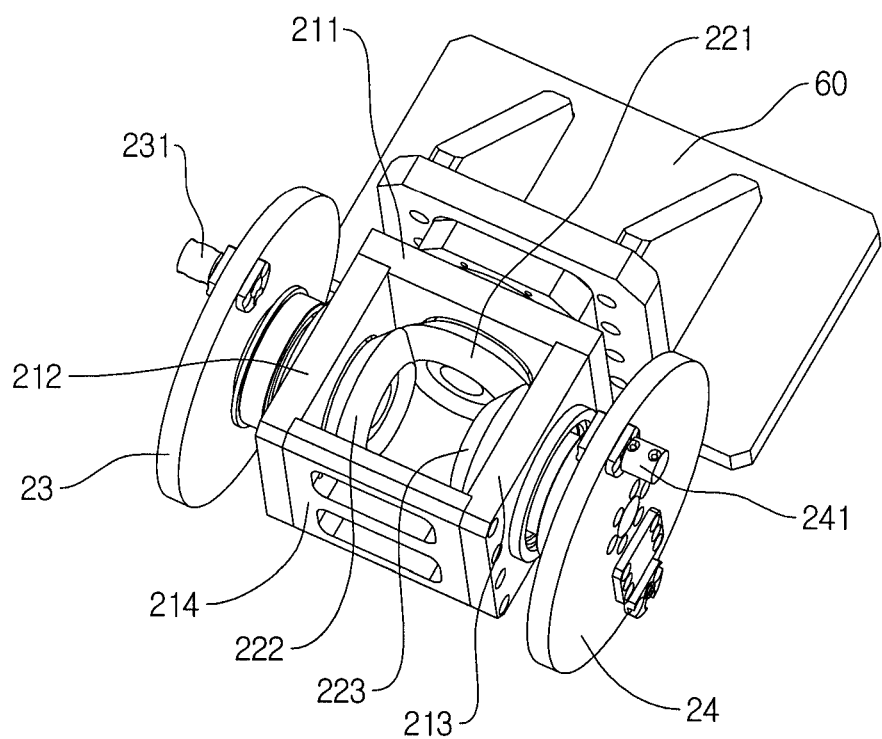
FIG. 2 is a partial perspective view of the weight compensation mechanism of the robot arm shown in FIG. 1.
Figure 3:
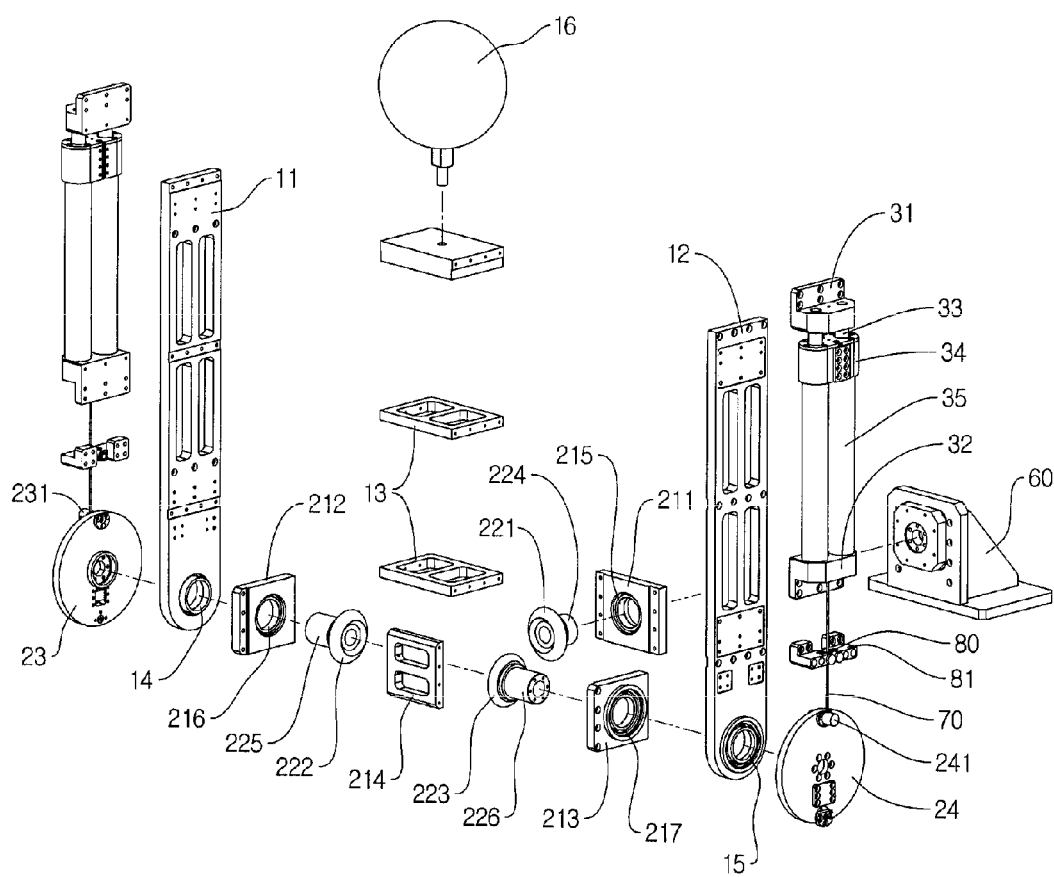
FIG. 3 is an exploded perspective view of the robot arm shown in FIG. 1.

FIG. 1 is a perspective view of a robot arm having a weight compensation mechanism according to an embodiment. FIG. 2 is a partial perspective view of the weight compensation mechanism of the robot arm shown in FIG. 1. FIG. 3 is an exploded perspective view of the robot arm shown in FIG. 1.

Referring to FIGS. 1 to 3, the robot arm 100 having the weight compensation mechanism according to the embodiment includes a link member 10 that is a basic frame of the robot arm 100, a moving mechanism 20 provided at a joint portion of the link member 10 to move according to the rotary movement of the link member 10 and weight offsetting parts 30 that absorb the gravitation generated by the weight of the robot arm 100 based on the movement of the robot arm 100. The robot arm 100 is a two-degree-of-freedom joint robot arm that can be individually rotated about first and second virtual axes 40 and 50 crossing each other.

The link member 10 includes a pair of sidewall links 11 and 12 spaced apart from each other at a predetermined interval, and a plurality of spacer links 13 that maintain the interval between the sidewall links 11 and 12. Bearings 14 and 15 are installed in lower openings of the sidewall links 11 and 12, respectively, so that the robot arm 100 can be rotated about the second virtual axis 50. A desired object 16 with a weight may be mounted at a top portion of the link member 10. The shape and arrangement of such a link member may be variously modified according to the structure of the robot arm.

The moving mechanism 20 includes a gear box 21, a plurality of bevel gears 22 installed in the gear box 21 and a pair of cam plates 23 and 24 connected to the bevel gears 22.

The gear box 21 is formed by assembling four sidewall members 211, 212, 213 and 214. Bearings 215, 216 and 217 are installed in the three sidewall members 211, 212 and 213 to support the bevel gears 22, respectively.

The bevel gears 22 include a central bevel gear 221 fixed directly to a base 60, and a pair of moving bevel gears 222 and 223 engaged with the central bevel gear 221 respectively at both sides of the central bevel gear 221. A connection shaft portion 224 supported by the bearing 215 of the sidewall member 211 is protruded at one side of the central bevel gear 221. The connection shaft portion 224 is fixed to the base 60. Connection shaft portions 225 and 226 supported by the bearings 216 and 217 of the sidewall members 212 and 213 are also protruded at one sides of the pair of moving bevel gears 222 and 223, respectively.

The cam plates 23 and 24 are integrally fixed to the ends of the connection shaft portions 225 and 226 of the moving bevel gears 222 and 223, respectively. Therefore, the moving bevel gears 222 and 223 and the cam plates 23 and 24 are rotated together. Spaces are formed between the sidewall members 212 and 213 and the cam plates 23 and 24 by the connection shaft portions 225 and 226, respectively. The connection shaft portions 225 and 226 are fixed to the link member 10 so as to be rotatably supported by the link member. That is, the connection shaft portions 225 and 226 of the moving bevel gears 222 and 223 are inserted into the bearings 14 and 15 of the sidewall links 11 and 12, respectively. Rotatable connection tools 231 and 241 are mounted on outer surfaces of the cam plates 23 and 24, respectively.

Each of the weight offsetting parts 30 includes a pair of fixing bodies 31 and 32 that are respectively fixed to outer surfaces of the sidewall links 11 and 12, and are spaced apart from each other at a predetermined distance; a guide bar 33 connected between the fixing bodies 31 and 32; a sliding body 34 that moves while having the guide bar 33 inserted thereinto; and an elastic member 35 into which the guide bar 33 is inserted between the sliding body 34 and the fixing body 32.

The elastic member 35 may be, for example, a coil-type spring, but is not limited thereto. That is, the elastic member 35 may include various elastic members such as a leaf spring. Although two guide bars 33 and two elastic members 35 are provided in the embodiment, the numbers of guide bars and elastic members may be increased or decreased.

Meanwhile, the sliding bodies 34 are connected to the connection tools 231 and 241 of the cam plates 23 and 24 through steel wires, respectively. That is, one ends of the steel wires are fixed to the connection tools 231 and 241, respectively, and the other end of each of the steel wires 70 passes through the fixing body 32 and is then fixed to the sliding body 34.

A pair of pulleys 80 that support each of the steel wires 70 are provided to a support body 81 between the moving mechanism 20 and the weight offsetting part 30.

The configuration of the robot arm 100 having the weight compensation mechanism has been described. Hereinafter, the operation of the robot arm 100 having the weight compensation mechanism will be described.

Figure 4:
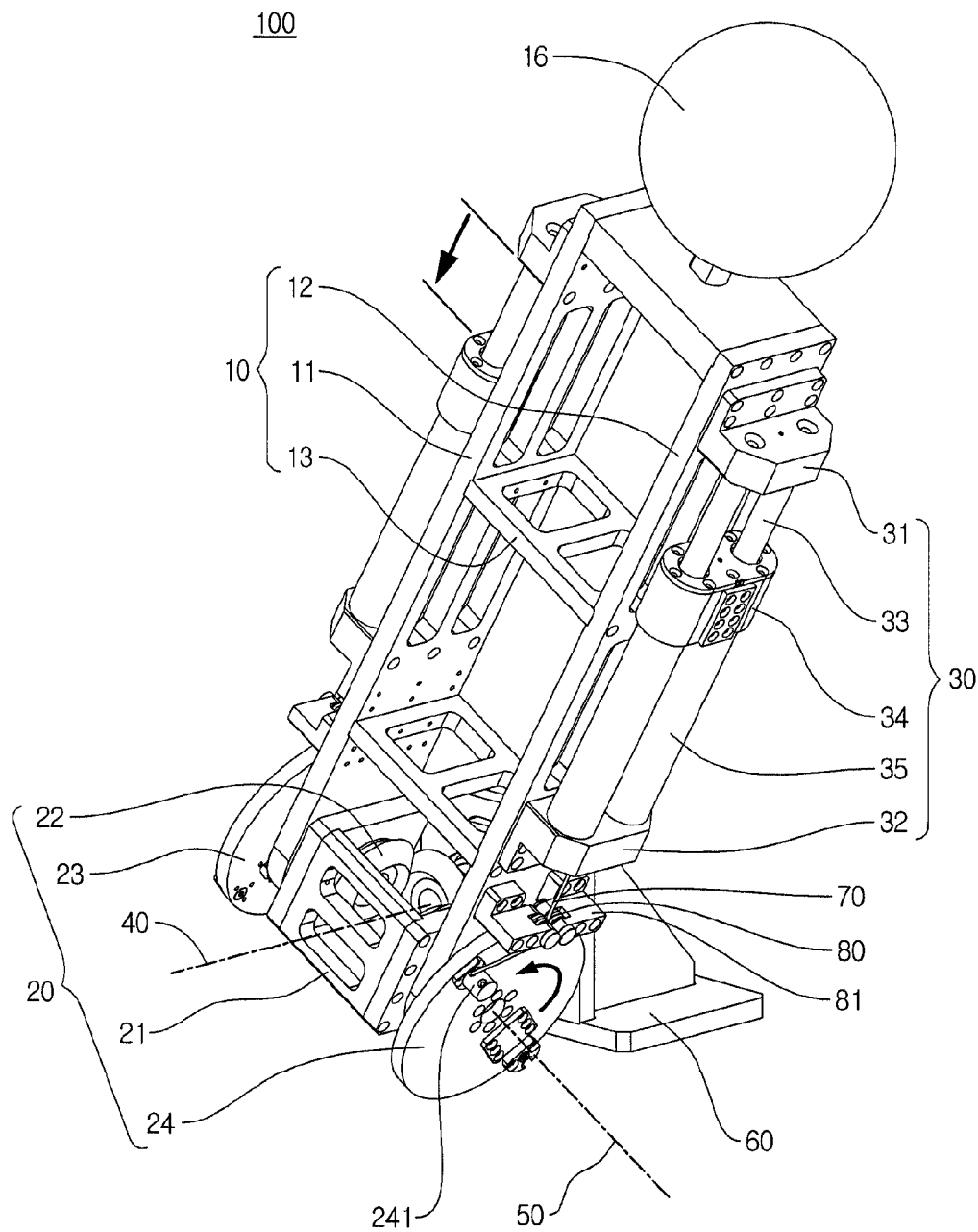
FIG. 4 is a perspective view of the robot arm having the weight compensation mechanism, rotated about a first virtual axis according to the embodiment.
Figure 5:
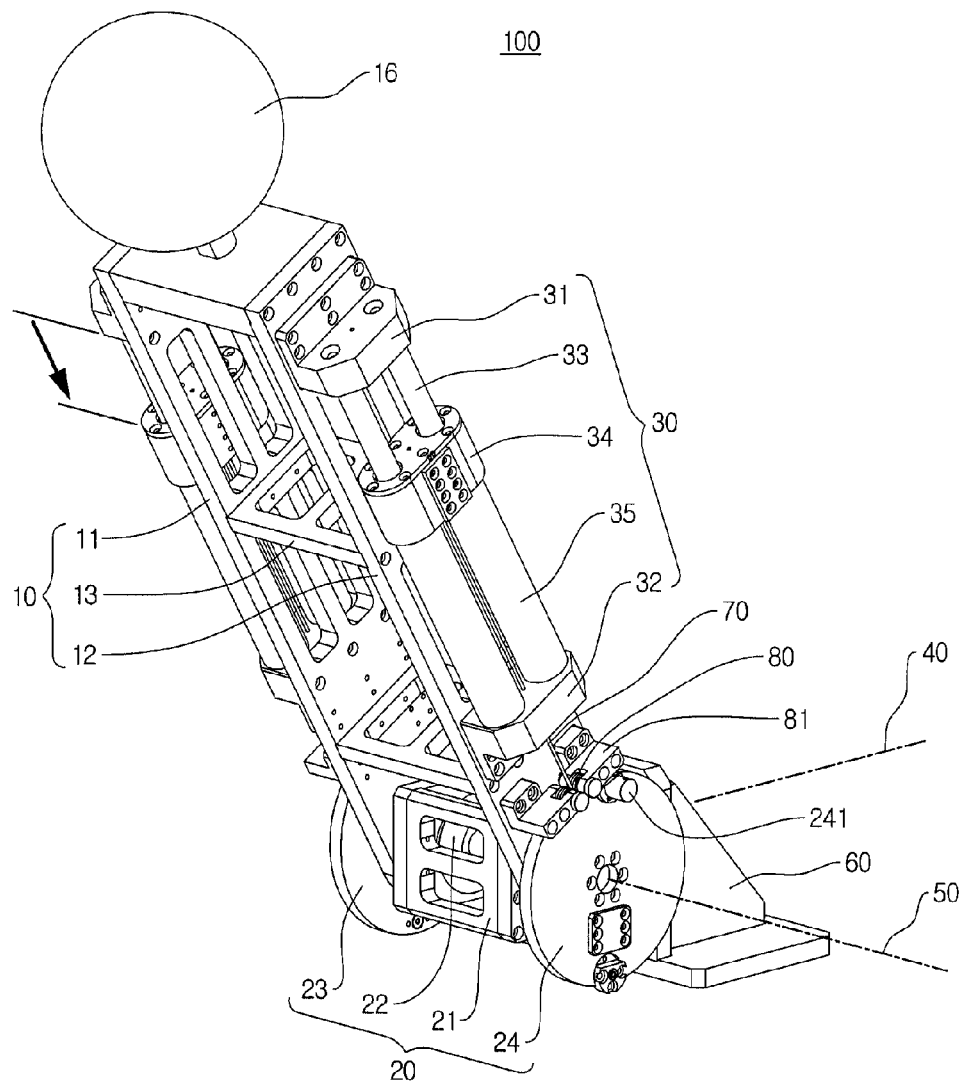
FIG. 5 is a perspective view of the robot arm having the weight compensation mechanism, rotated about a second virtual axis according to the embodiment.

FIG. 4 is a perspective view of the robot arm having the weight compensation mechanism, rotated about a first virtual axis according to the embodiment. FIG. 5 is a perspective view of the robot arm having the weight compensation mechanism, rotated about a second virtual axis according to the embodiment.

The robot arm 100 having the weight compensation mechanism according to the embodiment is a two-degree-of-freedom joint robot that can be individually rotated about the first and second virtual axes 40 and 50.

First, the operation of the robot arm 100 rotated about the first virtual axis 40 will be described. As shown in FIG. 4, if the link member 10 is rotated about the first virtual axis 40 by applying a force to the object 16, the gear box 21 is rotated about the connection shaft portion 224 of the central bevel gear 221 in harmony with the rotation of the link member 10. In this case, the moving bevel gears 222 and 223 are rotated in harmony with the rotation of the gear box 21 while being engaged with the central bevel gear 221. Accordingly, the cam plates 23 and 24 integrally connected to the moving bevel gears 222 and 223 are also rotated together.

If the cam plates 23 and 24 are rotated, the connection tools 231 and 241 fixed to the cam plates 23 and 24 are moved to draw the steel wires 70, respectively. Accordingly, the sliding body 34 compresses the elastic member 35 while being moved toward the fixing body 32 by the tension of the steel wire 70. The compressed elastic member 35 offsets the gravitation generated by the weight of the robot arm 100. Thus, although the robot arm 100 is rotated at a certain angle about the first virtual axis 40 as shown in FIG. 4, it is not moved downward any more due to the gravitation, and its position can be maintained in a state such as a non-gravitation state as it is.

Next, the operation of the robot arm 100 rotated about the second virtual axis 50 will be described. As shown in FIG. 5, if the link member 10 is rotated about the second virtual axis 50, it is rotated about the connection shaft portions 225 and 226 of the moving bevel gears 222 and 223. In this case, the moving mechanism 20, i.e., the bevel gear 22 and the cam plates 23 and 24, is not rotated but maintains its original position as it is.

Thus, only the link member 10 having the weight offsetting parts 50 provided thereto is rotated, so that the tension for drawing the sliding body 34 is generated in the steel wire 70. Accordingly, the elastic member 35 is compressed. The compressed elastic member 35 offsets the gravitation generated by the weight of the robot arm 100. Thus, although the robot arm 100 is rotated at a certain angle about the second virtual axis 50 as shown in FIG. 5, it is not moved downward any more due to the gravitation, and its position can be maintained in a state such as a non-gravitation state as it is.

Meanwhile, the elastic coefficient of the elastic member 35 may be properly determined in consideration of the weight of the robot arm 100, the length of the robot arm 100, and the like.

As described above, a weight compensation mechanism according to an embodiment can remarkably reduce the power of a power source used to driving a robot arm and various link members, so that the entire weight of the robot arm can be decreased and power efficiency can be increased, thereby saving much energy.

Also, since the weight compensation mechanism uses a relatively small amount of power, manufacturing cost can be reduced. Accordingly, it is possible to develop products with a competitive price through practical use in the future, and import replacement and export enhancement can be expected.

While the disclosure has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A weight compensation mechanism installed in a link member rotatable in a plurality of directions, the weight compensation mechanism comprising:
    a plurality of bevel gears that rotate in harmony with the rotation of the link member;
    one or more cam plates, each of the cam plates connected to one of the bevel gears to be rotated together with the connected bevel gear; and
    one or more sets of weight offsetting parts, each set of the weight offsetting parts connected to one of the cam plates with a steel wire, and each set of the weight offsetting parts compressing an elastic member based on the rotation of the link member and the cam plates,
    wherein each set of the weight offsetting parts comprises:
        a pair of fixing bodies disposed opposite to each other at an interval on one surface of the link member;
        the elastic member, disposed between the fixing bodies; and
        a sliding body, connected to the steel wire, that compresses the elastic member, the compression of the elastic member absorbing gravitation generated by the weight of the link member.

2. The weight compensation mechanism according to claim 1, wherein the plurality of bevel gears comprise:
    a central bevel gear fixed to a base; and
    a pair of moving bevel gears rotated while being engaged with the central bevel gear.

3. The weight compensation mechanism according to claim 2, wherein the cam plates are connected to the pair of moving bevel gears, respectively.

4. The weight compensation mechanism according to claim 3, wherein a connection shaft portion is formed between each of the moving bevel gears and the cam plates, and the link member is provided to the connection shaft portions to be rotated in one direction.

5. The weight compensation mechanism according to claim 1, further comprising one or more connections tools, each of the connection tools rotatably fixed to a side of one of the cam plates and having the steel wire fixed thereto.

6. The weight compensation mechanism according to claim 1, wherein a guide bar inserted into the sliding body to be moved is connected between the fixing bodies, and the elastic member that is a spring is disposed to an outside of the guide bar.

7. The weight compensation mechanism according to claim 1, further comprising pulleys for supporting the movement of each of the steel wires.

8. A robot arm comprising the weight compensation mechanism according to claim 1.

* * * * *